United States Patent [19]
von Koch

[11] 4,120,481
[45] Oct. 17, 1978

[54] ELECTROMAGNETIC CONTROL VALVE, ESPECIALLY FOR AUTOMATICALLY SHIFTING CHANGE-SPEED TRANSMISSIONS

[75] Inventor: Arwed von Koch, Stuttgart, Germany

[73] Assignee: Daimler-Benz Aktiengesellschaft

[21] Appl. No.: 665,861

[22] Filed: Mar. 11, 1976

[30] Foreign Application Priority Data

Mar. 14, 1975 [DE] Fed. Rep. of Germany ....... 2511152

[51] Int. Cl.² .............................................. F16K 31/10
[52] U.S. Cl. ...................................... 251/129; 251/138
[58] Field of Search ................................ 251/129, 138

[56] References Cited

U.S. PATENT DOCUMENTS

| | | | |
|---|---|---|---|
| 2,675,508 | 4/1954 | Ray | 251/138 X |
| 3,054,426 | 9/1962 | Fritz et al. | 251/138 X |
| 3,058,038 | 10/1962 | Stedman, Jr. et al. | 251/129 X |
| 3,531,080 | 9/1970 | Dillon | 251/129 |
| 3,532,121 | 10/1970 | Sturman et al. | 251/129 X |
| 3,570,807 | 3/1971 | Sturman et al. | 251/129 X |
| 3,621,863 | 11/1971 | Caine | 251/129 X |

Primary Examiner—Arnold Rosenthal
Attorney, Agent, or Firm—Craig & Antonelli

[57] ABSTRACT

An electromagnetic control valve for pressure media, in which the throttled inflowing pressure medium is controllable with the aid of an excess pressure valve whose valve body is displaceable with respect to the coordinated valve seat by means of an armature extending essentially transversely thereto as a function of the energization of a ring-shaped electromagnet; the armature is thereby pivotal about an axis disposed outside of the magnetic gap, and the system formed by the armature and by the valve closure body is sealingly suspended at a diaphragm essentially in the mass center whereby the diaphragm sealingly separates the magnetic part from the valve part; the pivot axis of the system thereby lies essentially in the plane of the diaphragm.

30 Claims, 8 Drawing Figures

ELECTROMAGNETIC CONTROL VALVE, ESPECIALLY FOR AUTOMATICALLY SHIFTING CHANGE-SPEED TRANSMISSIONS

The present invention relates to an electromagnetic control valve for pressure media, especially for the working- or control-pressure in automatically shifting motor vehicle change-speed transmissions, whereby a pressure medium inflowing in a throttled manner is controllable with the aid of an excess pressure valve whose valve body is displaceable with respect to the coordinated valve seat by means of an armature extending essentially transversely thereto in dependence on the energization of a ring-shaped electromagnet, whereby the armature is pivotal about an axis located outside of the magnetic gap.

A valve of the aforementioned type was already proposed in the German Patent Application P 23 26 627 whereby, however, the magnet space is not separated from the valve space. As a result thereof, contaminations such as dirt particles which are present in the oil stream may deposit in the magnet gaps so that the exact control is impaired. Furthermore, the hitherto-proposed valve cannot be installed independently of its position. Finally, also the control characteristics of this valve cannot be changed. The present invention is concerned with the task to provide a valve which no longer exhibits the aforementioned disadvantages. The underlying problems are solved according to the present invention with the valves of the aforementioned type in that the system formed of armature and valve closure body is sealingly suspended at a diaphragm essentially in the mass center, which diaphragm sealingly separates the magnet part from the valve part and in that the pivot axis of the system lies in the diaphragm plane.

The construction according to the inventive proposal offers the great advantage that now the valve space and the magnet space are completely separated from one another. The magnetic gap can therefore no longer be soiled. Additional assembly advantages also result therefrom because both parts can be manufactured as individual aggregates, so to speak of, and can be preassembled. Furthermore, a far-reaching independence from the installed position results from the suspension in the mass center, i.e., in the point of the center of gravity of the mass, so that the installed position then can no longer influence the control function of the valve. Furthermore, a frictionless suspension results in particular if, according to the present invention, a knife edge suspension is used.

A preferred embodiment of the present invention provides that the armature is constructed as a preferably conical pin and is arranged coaxially to the ring magnet, and in that this armature extends through a ring-shaped first pole shoe directly adjacent the diaphragm and in that a second pole shoe of the electromagnet located outside of the axis of symmetry is coordinated to the end of this armature remote from the diaphragm. The advantageous possibility results therefrom to change the control characteristics. Thus, for example, simply by pivoting the second pole shoe, the direction of the magnetic force can be reversed. One can achieve in this manner, for example, positive-proportional pressure control characteristics with or without pre-pressure, as well as also negative-proportional control characteristics, and/or a tolerance compensation by slight pivot angles.

In detail, it is proposed according to the present invention that the second pole shoe is arranged on an insert member pivotal about the symmetry axis. The insert member may, of course, also form the pole shoe itself. One contemplates in that connection primarily a rotatable threaded plug which can be fixed in any desired position by a nut, by means of fine teeth or in any other suitable manner. It is thereby proposed that the second pole shoe is arranged essentially opposite the end face of the armature. For a universal adjustability, the construction is realized according to the present invention in such a manner that the armature is constructed at its end remote from the diaphragm in the shape of a spherical segment about the point of intersection between the symmetry axis and the pivot axis and that the second pole shoe has a corresponding construction. A fine gradation can be achieved in this manner by means of the fine pivotal movements of the second pole shoe with respect to the armature so that one is able to match, for example, several cooperating valves quite accurately with respect to one another.

Another possibility resides according to the present invention in that the second pole shoe is constructed segment-like and is coordinated to the circumference of the pole shoe. Finally, for producing higher pressures, the arrangement may be made in such a manner that the second pole shoe is disposed opposite the end face of the armature and also surrounds with a segment-like extension thereof the circumference of the second pole shoe.

With respect to the valve and armature construction, the present invention proposes that the diaphragm is clamped-in between the armature and a T-shaped support arm whose cross beam forms the pivot axis together with a knife edge suspension or the like and whose center beam receives at the base an adjustable support sleeve for the valve pin. The support sleeve may thereby be arranged in a longitudinal slot of the support arm. As a result of the clamping action of the slot, the support sleeve—which for its adjustment may be constructed as threaded sleeve—can be clamped fast in any desired position without any additional securing means.

In another embodiment according to the present invention, the valve pin is provided with a conical tip and by means of this conical tip cooperates directly with the valve seat. If therefore guides itself, so to speak of, in the valve seat by means of its conical tip. This guidance can be further assisted by a pin at the conical tip which further extends into the inlet bore and prevents a falling-out. In another embodiment a cylinder sleeve closed on one side and provided with a flat bottom serves as valve closure member which is longitudinally displaceably guided in a housing bore.

The transmission of the movement of the armature takes place according to the present invention in that a pin with a conical end engages in the cylinder sleeve, whose other end is supported in the support sleeve. The effect of temperature of the valve is influenced by means of the shape of the valve seat (conical or flat).

In the two described embodiments, the magnetic force can act directly against the pressure. On the other hand, also the coordination of a spring is possible. It is proposed in connection therewith that a spring is arranged on the base of the support arm concentrically to the support sleeve, whose other spring end is supported against an adjustable abutment in the housing. The spring is required for the adjustment of a base pressure if the magnetic force is to act against the pressure or together with the pressure against the spring.

The valve according to the present invention can be used universally. It is particularly suited for a stepless retarder control or for the control, for example, of modulating pressures and/or control pressures in an automatically shifting motor vehicle transmission.

Accordingly, it is an object of the present invention to provide an electromagnetic control valve which avoids by simple means the aforementioned shortcomings and drawbacks encountered in the prior art.

Another object of the present invention resides in an electromagnetic control valve in which contaminations present in the oil stream cannot impair the exact control of the valve.

A further object of the present invention resides in an electromagnetic control valve of the type described above which can be installed independently of its selected position and permits a change in the control characteristics of the valve by simple means.

Still a further object of the present invention resides in an electromagnetic control valve in which the valve space and the magnet space are completely separated from one another so that the magnetic gap can no longer be contaminated or soiled.

Another object of the present invention resides in an electromagnetic control valve which is simple in construction and offers significant advantages as regards assembly thereof.

These and further objects, features and advantages of the present invention will become more apparent from the following description when taken in connection with the accompanying drawing which shows, for purposes of illustration only, several embodiments in accordance with the present invention, and wherein.

Figure 1:
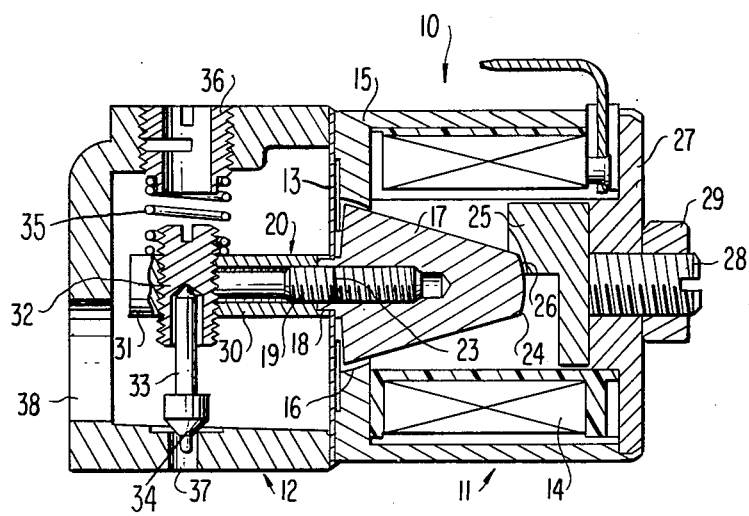
FIG. 1 is a longitudinal cross-sectional view through a first embodiment of an electromagnetic control valve in accordance with the present invention.
Figure 2:
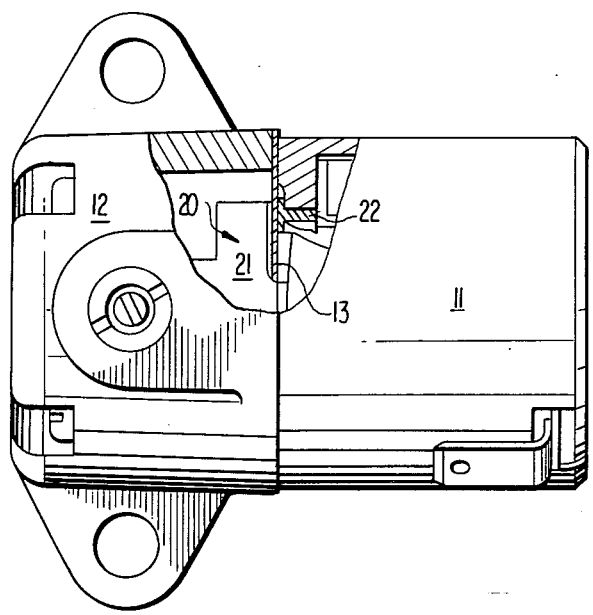
FIG. 2 is a plan view, partly in cross section, of the electromagnetic control valve of FIG. 1, rotated through 90°.
Figure 7:
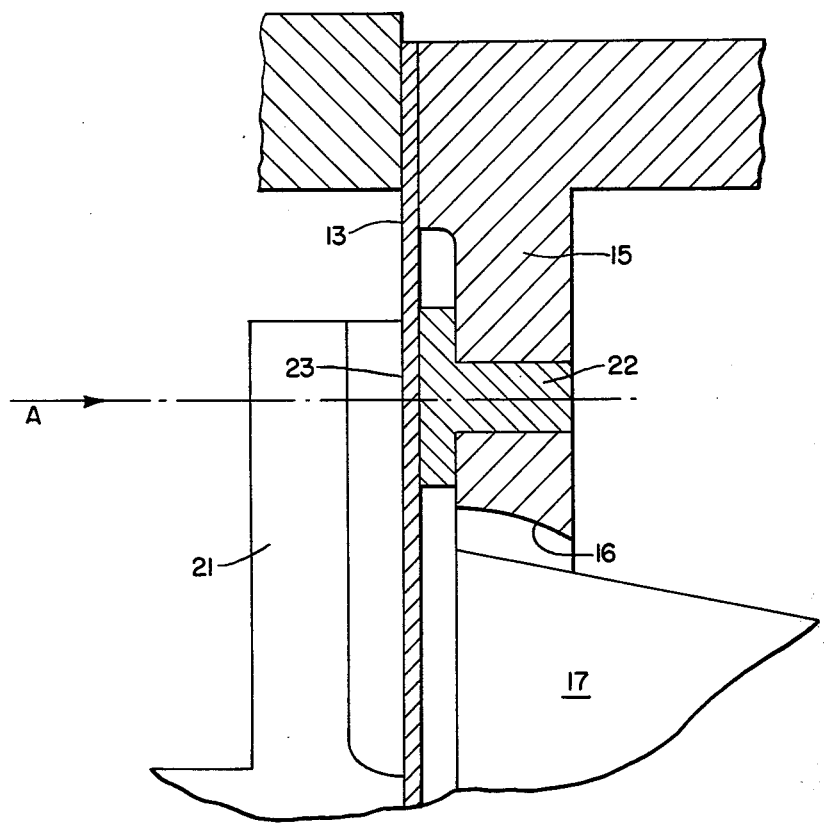
FIG. 7 is a cross-sectional view, on an enlarged scale, of a portion of the suspension or bearing in accordance with the present invention.
Figure 8:
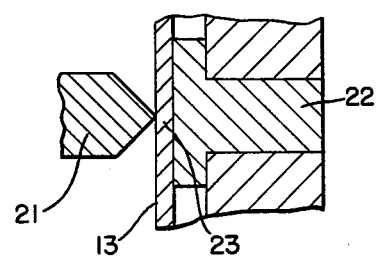
FIG. 8 is a cross-sectional view taken in the direction of the arrow A in FIG. 7.

Referring now to the drawing wherein like reference numerals are used throughout the various views to designate like parts, and more particularly to FIGS. 1 and 2, according to these two figures, the entire control valve generally designated by reference numeral 10 consists of a magnet part generally designated by reference numeral 11 and of a valve part generally designated by reference numeral 12. Both parts 11 and 12 are separated oil-tight from one another by a diaphragm 13 disposed therebetween. A pot-shaped electromagnet 14 is disposed in the magnet part 11 which is provided with a circularly shaped first pole shoe 15 directly adjacent the diaphragm 13. This first pole shoe 15 forms a first ring-shaped magnetic gap 16 together with a conical pin 17 operating as armature. The diaphragm 13 is centered on a short extension 18 thereof. A connecting pin 19 connects this armature 17 with a support arm generally designated by reference numeral 20 in the valve part 12. The support arm 20 is constructed T-shaped (FIG. 2). The cross beam 21 of the support arm 20 forms together with two corresponding abutment pins 22 (FIGS. 2, 7, 8) in the first pole shoe 15 and diaphragm 13 a knife edge suspension or knife edge bearing in such a manner that the pivot axis 23 (FIG. 1) of the entire system constituted by the armature and the valve lies in the plane of the diaphragm 13. The mass center of this system lies directly or only with very slight deviations in the point of intersection of this pivot axis 23 with the symmetry axis so that therefore the entire system is suspended in the mass center, i.e., in the center of gravity thereof. It can therefore be utilized in any installed position because external influences such as, for example, shocks or starting accelerations or braking decelerations cannot exert any torque on this system.

The end 24 of the armature 17 opposite the diaphragm 13 is constructed in the shape of a spherical segment. A second pole shoe 25 is disposed opposite to the armature end 24, and more particularly eccentrically to the symmetry axis so that a second magnetic gap 26 results. The second pole shoe 25 is rotatably arranged in the cover 27 by means of a threaded plug 28 and is fixable in any desired position by means of a nut 29.

The longitudinal beam 30 (FIG. 1) of the support arm 20 is slotted at the end thereof and a support sleeve 32 is adjustably screwed into this slot 31 as threaded plug. The support sleeve 32 serves for receiving a valve pin 33 which by means of its conical end 34 cooperates directly with the valve seat. A spring 35 is arranged concentrically to this support sleeve 32. It is supported with its other end on an adjusting plug 36 in the housing. The pressure medium flows-in through the inlet opening 37 by way of a throttle (not shown) and then again leaves pressureless through the opening 38. The controlled or regulated pressure is therefore picked-up between the throttle (not shown) and the inlet opening 37.

If with the illustrated valve the electromagnet is more or less energized, then the second pole shoe 25 exerts on the system formed by the armature 17 and the support arm 20 a torque about the pivot axis 23 which acts in the same direction as the spring force but opposite the inlet pressure. In this manner, the control characteristic can be achieved as is illustrated, for example, in FIG. 3c. The spring 35 is thereby determinative for the pre-pressure 39. If one were to omit the spring 35, then one would obtain a control characteristic according to the diagram in FIG. 3a. If one now pivots the second pole shoe 25 through 180° (it would then lie in the lower part in FIG. 1), then the torque exerted thereby would act opposite the spring force and in the same direction as the pressure. In this case a control characteristic results according to the diagram in FIG. 3b, whereby again the pre-pressure 40 illustrated thereat depends on a corresponding spring (in lieu of the illustrated spring 35).

Figure 4:
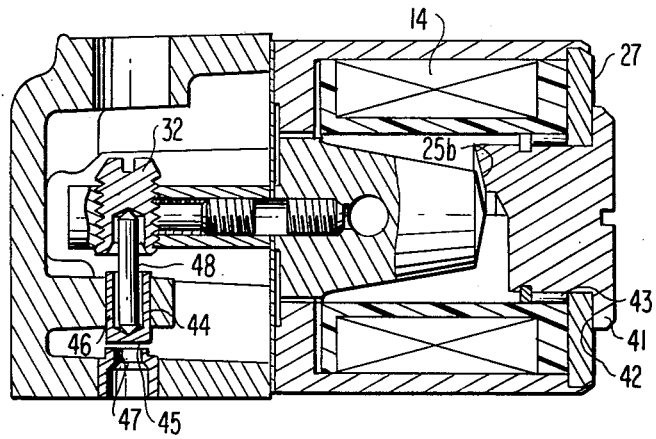
FIG. 4 is a longitudinal cross-sectional view through a modified embodiment of an electromagnetic control valve in accordance with the present invention.

FIG. 4 illustrates an arrangement which is the same in principle. The second pole shoe 25b is again constructed plug-like and is provided externally with a flange 41. The inner surface 42 of this flange 41 is provided with fine teeth—as also the corresponding surface of the cover 27. A spring 43 keeps these teeth in constant engagement so that the second pole shoe 25b is fixed in the once-adjusted position.

The valve closure body is formed in this case by a cylinder sleeve 44 with a closed, flat bottom 45. The cylinder sleeve 44 is guided in a housing bore 46 so that it can displace itself with respect to the valve seat 47 only axially parallel. A transmission pin 48 assumes the connection to the support sleeve 32. A spring is not present in this embodiment. Consequently, the same manner of operation results as with the valve according to FIG. 1, however, now with the characteristics according to FIG. 3a. Such a valve can be utilized with good success for a retarder control whereby the current flowing through the electromagnet 14 is controlled by the brake pedal. When the brake pedal is depressed, the pressure in the retarder also increases with an increasing flow of current through the magnet, i.e., therewith its braking action also increases.

Figure 3:
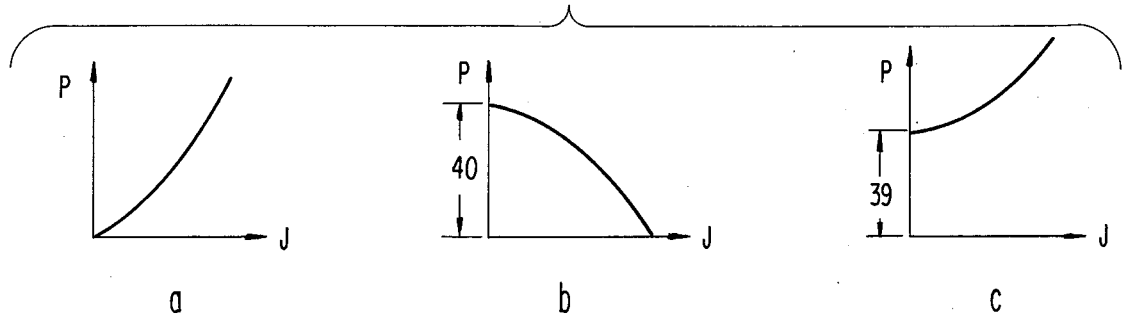
FIGS. 3a–3c are schematic diagrams representing control characteristics attainable with the valve in accordance with the present invention in which the pressure p is plotted against the energizing current j.
Figure 5:
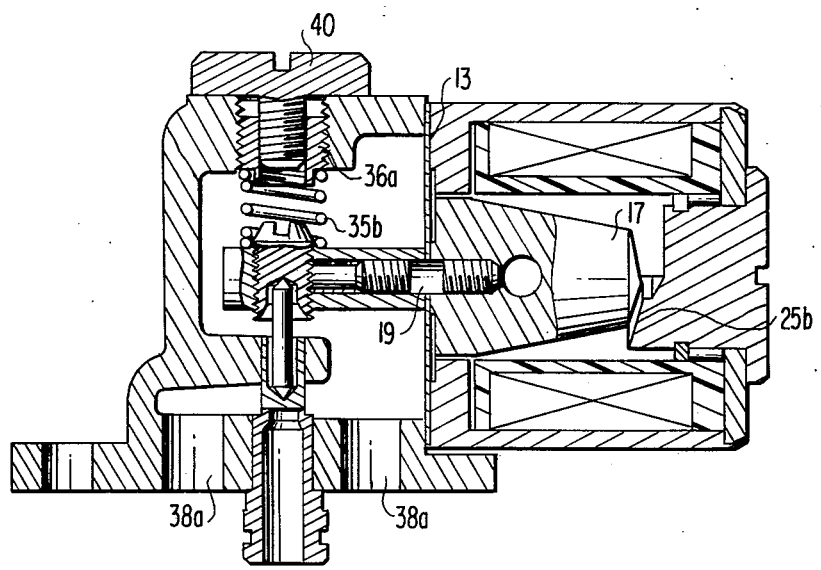
FIG. 5 is a longitudinal cross-sectional view through a still further modified embodiment of an electromagnetic control valve which is oil-tight for external installation.

FIG. 5 illustrates an electromagnetic control valve for the modulating pressure control in an automatically shifting motor vehicle change-speed transmission. The construction corresponds in principle to the embodiment according to FIGS. 1 and 2 respectively 4. The second pole shoe 25b inclusive its fastening is constructed according to the embodiment of FIG. 4, however, it is rotated through 180°. The torque exerted by the pole shoe 25b therefore acts in the same direction as the pressure and opposite a spring 35b which is arranged corresponding to the embodiment of FIG. 1. Consequently, a characteristic curve according to FIG. 3b is achieved. A further difference with respect to the embodiment according to FIG. 1 resides in that—as in the embodiment according to FIG. 4—the diaphragm 13 is not centered on an extension of the armature 17, but instead on the connecting pin 19. The construction of the valve itself corresponds to that according to FIG. 4. The discharge openings 38a now lead back into the transmission housing (not shown). The spring abutment 36a is in principle adjustable according to the construction of FIG. 1. A closure plug 40 secures this adjustment and simultaneously seals the housing oil-tight against the outside.

Figure 6:
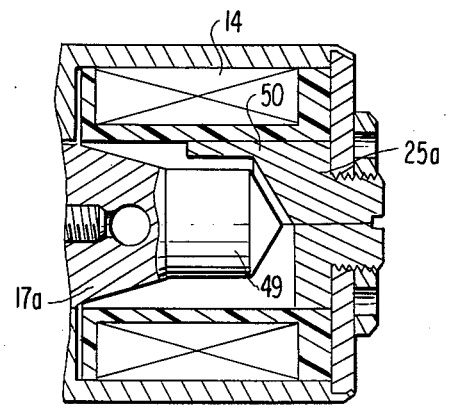
FIG. 6 is a partial longitudinal cross-sectional view through still another modified embodiment of an electromagnetic control valve in accordance with the present invention for high pressures.

In the embodiment according to FIG. 6, the valve space with the valves and the knife edge suspension as well as the magnet space are constructed in principle as already illustrated in FIG. 4. In deviation therefrom, the armature 17a now includes a cylindrical portion 49. The second pole shoe 25a terminates in a segment-like extension 50 which is disposed opposite the cylindrical extension 49 at the circumference thereof. This extension 49 is surrounded in its entirety on one side, so to speak of, by the second pole shoe 25a, so to speak of. In this embodiment, considerably higher pressures can be attained as might be necessary, for example, for a retarder control.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An electromagnetic control valve for pressure media, the control valve includes a magnet part and a valve part, the magnet part including an electromagnet means, and an armature means controlled by the electromagnet means, and at least one magnetic gap formed between a portion of the electromagnet means and the armature means, the valve part including a valve body means and a valve seat means cooperable with the valve body means, means for throttling a pressure medium flowing into the valve part, the valve body means being operatively connected with the armature means so as to be displaceable with respect to the valve seat means in dependence upon an energization of the electromagnet means to control an inflow of the throttled pressure medium into the valve part, and means for mounting the armature means and the valve body means so as to be pivotal about an axis located outside the magnetic gap, characterized in that a diaphragm means is mounted between the magnet part and the valve part for sealing said magnet part from said valve part, and in that the pivotal mounting means includes knife edge bearing means for suspending the armature means and valve body means at the diaphragm means at least approximately in a mass center of the armature means and valve body means.

2. A valve according to claim 1, characterized in that the pivot axis of said armature means and valve body means is located essentially in a plane in which the diaphragm means is disposed.

3. A valve according to claim 2, characterized in that the electromagnet means is ring-shaped.

4. A valve according to claim 3, characterized in that the armature means extends essentially transversely to the valve body means.

5. A valve according to claim 4, characterized in that the at least one magnetic gap is ring-shaped, the armature means is constructed as a pin and is arranged essentially coaxially to the ring-shaped magnetic gap, the electromagnet means further includes a first ring-shaped pole shoe directly adjacent the diaphragm means, the first pole shoe defining with a portion of the armature means the ring-shaped magnetic gap with said armature means extending through the magnetic gap, and in that the electromagnet means further includes a second pole shoe located outside of an axis of symmetry of the armature means, the second pole shoe is coordinated to an end of the armature means remote from the diaphragm means.

6. A valve according to claim 5, characterized in that the pin is conical.

7. A valve according to claim 5, characterized in that an insert means pivotal about the axis of symmetry is provided for mounting the second pole shoe at the control valve.

8. A valve according to claim 5, characterized in that a spherical segment is provided on an end of the armature means remote from the diaphragm means, the spherical segment is shaped about a point of intersection between the axis of symmetry and the pivot axis, and in that the second pole shoe has an approximately corresponding shape.

9. A valve according to claim 8, characterized in that a substantially T-shaped support arm means having a cross beam is provided, the diaphragm means is clamped between the armature means and the substantially T-shaped support arm means, the cross beam together with a knife edge suspension means forms the pivot axis, and in that a support sleeve means for a valve pin is mounted at a base of a center beam of the substantially T-shaped support arm means.

10. A valve according to claim 9, characterized in that the support sleeve means is adjustable.

11. A valve according to claim 9, characterized in that a longitudinal slot is provided in the support arm means and the support sleeve means is arranged in said longitudinal slot.

12. A valve according to claim 11, characterized in that the valve pin is provided with a conical tip said conical tip directly cooperates with the valve seat means.

13. A valve according to claim 11, characterized in that the valve body means includes a valve closure body, the valve closure body being constructed as a cylinder sleeve means closed on one side and having a substantially flat bottom, said cylinder sleeve means being longitudinally displaceably guided in a housing bore of the valve.

14. A valve according to claim 13, characterized in that a pin having a substantially conical end is provided, the conical end engages in the cylinder sleeve means an end opposite the conical end being supported in the support sleeve means.

15. A valve according to claim 14, characterized in that a spring is arranged concentrically to the support sleeve means and has a first end mounted on the base of the support arm means, and in that an adjustable abutment means is provided for supporting a second end of the spring in a housing of the valve.

16. A valve according to claim 15, characterized in that the second pole shoe is arranged essentially opposite an end face of the armature means.

17. A valve according to claim 15, characterized in that the second pole shoe is constructed segment-like and is coordinated to a circumference of the armature means.

18. A valve according to claim 15, characterized in that the second pole shoe includes a first portion disposed opposite an end face of the armature means and a second portion surrounding with a segment-like extension a circumference of the armature means.

19. A valve according to claim 1, characterized in that the armature means is constructed as a pin and is arranged essentially coaxially to the electromagnet means, the electromagnet means includes a first pole shoe directly adjacent the diaphragm means, the armature means extends through said first pole shoe, and in that the electromagnet means further includes a second pole shoe located outside of an axis of symmetry of said armature means, the second pole shoe is coordinated to an end of the armature means remote from the diaphragm means.

20. A valve according to claim 19, characterized in that an insert means pivotal about the axis of symmetry is provided for mounting the second pole shoe at the control valve.

21. A valve according to claim 19, characterized in that a spherical segment is provided on an end of the armature means remote from the diaphragm means, the spherical segment is shaped about a point of intersection between the axis of symmetry and the pivot axis, and in that the second pole shoe has an approximately corresponding shape.

22. A valve according to claim 1, characterized in that a substantially T-shaped support arm means having a cross beam is provided, the diaphragm means is clamped between the armature means and the substantially T-shaped support arm means, the cross beam together with a knife edge suspension means forms the pivot axis, and in that a support sleeve means for a valve pin is mounted at a base of a center beam of the substantially T-shaped support arm means.

23. A valve according to claim 22, characterized in that a longitudinal slot is provided in the support arm means and the support sleeve means is arranged in said longitudinal slot.

24. A valve according to claim 22, characterized in that the valve pin is provided with a conical tip said conical tip directly cooperates with the valve seat means.

25. A valve according to claim 22, characterized in that the valve body means includes a valve closure body, the valve closure body being constructed as a cylinder sleeve means closed on one side and having a substantially flat bottom, said cylinder sleeve means being longitudinally displaceably guided in a housing bore of the valve.

26. A valve according to claim 25, characterized in that a pin having a substantially conical end is provided, the conical end engages in the cylinder sleeve means an end opposite the conical end being supported in the support sleeve means.

27. A valve according to claim 25, characterized in that a spring is arranged concentrically to the support sleeve means and has a first end mounted on the base of the support arm means, and in that an adjustable abutment means is provided for supporting a second end of the spring in a housing of the valve.

28. A valve according to claim 19, characterized in that the second pole shoe is arranged essentially opposite an end face of the armature means.

29. A valve according to claim 19, characterized in that the second pole shoe is constructed segment-like and is coordinated to a circumference of the armature means.

30. A valve according to claim 19, characterized in that the second pole shoe includes a first portion disposed opposite an end face of the armature means and a second portion surrounding with a segment-like extension a circumference of the armature means.

* * * * *